(12) United States Patent
Kweon et al.

(10) Patent No.: US 7,316,865 B2
(45) Date of Patent: *Jan. 8, 2008

(54) ACTIVE MATERIAL FOR LITHIUM SECONDARY BATTERY AND METHOD OF PREPARING ACTIVE MATERIAL

(75) Inventors: Ho-Jin Kweon, Cheonan (KR); Jun-Won Suh, Cheonan (KR)

(73) Assignee: Samsung SDI Co., Ltd., Suwon-si (KR)

( * ) Notice: Subject to any disclaimer, the term of this patent is extended or adjusted under 35 U.S.C. 154(b) by 210 days.

This patent is subject to a terminal disclaimer.

(21) Appl. No.: 10/269,991

(22) Filed: Oct. 15, 2002

(65) Prior Publication Data

US 2003/0073004 A1    Apr. 17, 2003

(30) Foreign Application Priority Data

Oct. 17, 2001    (KR) .............................. 2001-64095

(51) Int. Cl.
*H01M 4/58*    (2006.01)

(52) U.S. Cl. .............................. 429/218.1; 429/231.1; 429/231.2; 429/231.3; 427/58; 427/126.3; 427/126.4; 252/518.1; 252/520.4; 252/521.2; 252/521.5

(58) Field of Classification Search ............. 429/218.1, 429/232, 213, 231.1, 231.2, 231.3; 427/58, 427/126.3, 126.4; 252/518.1, 520.4, 521.2, 252/521.5
See application file for complete search history.

(56) References Cited

U.S. PATENT DOCUMENTS

| | | | |
|---|---|---|---|
| 5,705,291 A | | 1/1998 | Amatucci et al. |
| 5,783,328 A | * | 7/1998 | Wang .......................... 429/224 |
| 6,372,385 B1 | * | 4/2002 | Kweon et al. ............ 429/231.3 |
| 6,737,195 B2 | * | 5/2004 | Kweon et al. ............ 429/231.1 |
| 6,749,965 B1 | * | 6/2004 | Kweon et al. ............ 429/231.1 |
| 6,753,111 B2 | * | 6/2004 | Kweon et al. ......... 429/231.95 |
| 6,797,435 B2 | * | 9/2004 | Kweon et al. ............ 429/231.5 |
| 6,818,349 B2 | * | 11/2004 | Choi et al. ................ 429/231.8 |
| 6,846,592 B2 | * | 1/2005 | Kweon et al. .............. 429/224 |
| 6,998,071 B2 | * | 2/2006 | Maeda et al. ............. 429/218.1 |
| 2002/0071990 A1 | | 6/2002 | Kweon et al. |
| 2003/0082442 A1 | * | 5/2003 | Choi et al. ................ 429/218.1 |

FOREIGN PATENT DOCUMENTS

| | | | |
|---|---|---|---|
| JP | 09-055210 | | 2/1997 |
| JP | 9-171813 | * | 6/1997 |
| JP | 11-016566 | | 1/1999 |
| JP | 11-185758 | | 7/1999 |
| KR | 2001-90522 | | 10/2001 |

* cited by examiner

*Primary Examiner*—Laura Weiner
(74) *Attorney, Agent, or Firm*—Stein, McEwen & Bui, LLP

(57) ABSTRACT

A process of manufacturing a positive active material for a lithium secondary battery includes preparing a coating-element-containing organic suspension by adding a coating-element source to an organic solvent, adding water to the suspension to prepare a coating liquid, coating a positive active material with the coating liquid, and drying the coated positive active material.

26 Claims, 11 Drawing Sheets

ACTIVE MATERIAL FOR LITHIUM SECONDARY BATTERY AND METHOD OF PREPARING ACTIVE MATERIAL

CROSS REFERENCE TO RELATED APPLICATION

This application claims the benefit of Korean Patent Application No. 2001-64095 filed on Oct. 17, 2001 in the Korean Intellectual Property Office, the content of which is incorporated herein by reference.

BACKGROUND OF THE INVENTION

1. Field of the Invention

The present invention relates to a process of preparing an active material for a lithium secondary battery, and more specifically, to a process of preparing an active material for a lithium secondary battery with improved workability and manufacturing productivity, and to an economical preparation process.

2. Description of the Related Art

A current commercial rechargeable lithium battery having an average discharge potential of 3.7 V (i.e., a battery having a substantially 4 V average discharge potential) is considered to be an essential element in the digital generation. Such a battery is an indispensable energy source for portable digital devices such as mobile telephones, notebook computers, camcorders, and so on (i.e., the "3C" devices). Generally, rechargeable lithium batteries use a material from or into which lithium ions are deintercalated or intercalated for positive and negative active materials. For the electrolyte, an organic solution of a lithium salt or a lithium ion-conducting polymer is used. A rechargeable lithium battery produces electric energy as a result of changes in the chemical potentials of the active materials during the intercalation and deintercalation reactions of the lithium ions. Factors that affect battery performance characteristics, such as capacity, cycle life, power capability, safety, and reliability, include electrochemical properties of active materials that participate in electrochemical reactions at the positive and negative electrodes. Therefore, there are continuing research efforts made for improvements in the electrochemical properties of the active materials at the positive and negative electrodes.

Among the active materials which have been considered for the active material of negative electrodes of batteries, lithium metal gives both high cell capacity and voltage because it has a high electrical capacity per unit mass and a relatively high electronegativity. However, since it is difficult to assure the safety of a battery using lithium metal, a carbonaceous material that is capable of intercalating and deintercalating lithium ions is used extensively for the active material of the negative electrodes in lithium secondary batteries. With the use of the carbonaceous material, battery performance, particularly cycle life and safety, has improved tremendously from that of the lithium metal battery. In order to further improve the negative electrode performance, it has been suggested to add an additive, such as boron, to the carbonaceous material, especially by coating the carbonaceous material with the additive. For example, a boron-coated graphite improves the performance characteristics of the carbonaceous materials.

Lithium metal compounds of a complex formula are often used as a positive active material of the lithium secondary battery. Typical examples include $LiCoO_2$, $LiMn_2O_4$, $LiNiO_2$, $LiNi_{1-x}Co_xO_2(0<x<1)$, $LiMnO_2$, and a mixture of these compounds. Manganese-based positive active materials such as $LiMn_2O_4$ or $LiMnO_2$ have relatively good safety properties, are less costly than the other materials, and are environmentally friendly. However, these manganese-based materials have a disadvantage of a relatively low capacity. $LiNiO_2$ has the highest discharge capacity of all positive active materials mentioned above, but it is difficult to synthesize and it is the least stable thermally among the compounds mentioned above.

$LiCoO_2$ has many technical advantages over the other materials, such as relatively good cycle life and relatively high specific energy. This compound is presently the most popular material for positive electrodes of commercially available Li-ion batteries. Specifically, among these compounds, $LiCoO_2$ is used most popularly in the battery industry since its overall performance characteristics, particularly cycle life, are superior to the others. Accordingly, most of the commercially available rechargeable lithium batteries use $LiCoO_2$ as the positive active material, even though its cost is relatively high. However, it is desirable to improve the thermal and cycling stability further on charge-discharge cycling at a high rate even though it is one of the most stable compounds of the presently available positive active materials. There is a great deal of research being done in the industry to develop a further improved active material in terms of overall performance as well as to reduce the cost, if possible.

Among previous efforts to improve the positive active material further are approaches in which a part of the Co from $LiCoO_2$ is substituted with other metals such as Al and Sn. Sony Corporation prepared $Li_xCo_{1-y}M_yO_2$ by doping about 1 to 5 percent by weight of Al into $LiCoO_2$, while A&TB (ASAHI & TOSHIBA BATTERY CO.) prepared an Sn-doped Co-based active material by substituting a part of the Co from $LiCoO_2$ with Sn.

Another approach is to coat a litigated compound with a coating material. In U.S. Pat. No. 5,292,601, $Li_xMO_2$ (where M is at least one element selected from Co, Ni, and Mn; and x is 0.5 to 1) is suggested as an improved alternative material over $LiCoO_2$. U.S. Pat. No. 5,705,291 suggests a process in which a composition comprising borate, aluminate, silicate, or mixtures thereof is coated onto the surface of a litigated intercalation compound. Japanese Patent Laid-Open No. Hei 9-55210 discloses that lithium nickel-based oxide is coated with an alkoxide of Co, Al, and Mn followed by heat-treatment to prepare a coated positive active material. Japanese Patent Laid-Open No. Hei 11-16566 discloses lithium-metal oxide coated with another metal and/or an oxide thereof. The latter metal includes Ti, Sn, Bi, Cu, Si, Ga, W, Zr, B, and Mo. Japanese Patent Laid-Open No. Hei 11-185758 discloses coating the surface of lithium manganese oxide with a metal oxide by using a co-precipitation process followed by heat-treating the same to prepare a positive active material.

Recently, with an increased demand for portable electronic equipment that is more compact and lightweight, there has been an increased demand for various types of batteries including a Li-ion battery with an improved active material that can assure good battery performance, safety, and reliability. A great deal of research and development has been devoted to improvements in performance and thermal stability of positive active materials to ensure improved cell performance, safety, and reliability of batteries under various use conditions, including many abuse conditions.

SUMMARY OF THE INVENTION

In order to solve the above and other problems, it is an object of the present invention to provide a process of preparing a positive active material for a lithium secondary battery with good electrochemical characteristics including cycle life, discharge potential, and power capability.

It is another object to provide a process of preparing an active material with improved workability and manufacturing productivity, and that can be produced in an economical preparation process.

Additional objects and advantages of the invention will be set forth in part in the description which follows, and in part, will be obvious from the description, or may be learned by practice of the invention.

In order to accomplish these and other objects, an embodiment of the present invention provides a process of preparing a positive active material for a lithium secondary battery, comprising preparing a coating-element-containing organic suspension by adding a coating-element source to an organic solvent, adding water to the suspension to prepare a coating liquid, coating a positive active material with the coating liquid, and drying the coated positive active material.

According to another embodiment of the present invention, a positive active material with improved electrochemical characteristics is prepared according to the above process.

BRIEF DESCRIPTION OF THE DRAWINGS

A more complete appreciation of the invention, and many of the attendant advantages thereof, will be readily apparent and more readily appreciated as the same becomes better understood by reference to the following detailed description when considered in conjunction with the accompanying drawings, wherein.

DETAILED DESCRIPTION OF THE EMBODIMENTS

Figure 1:
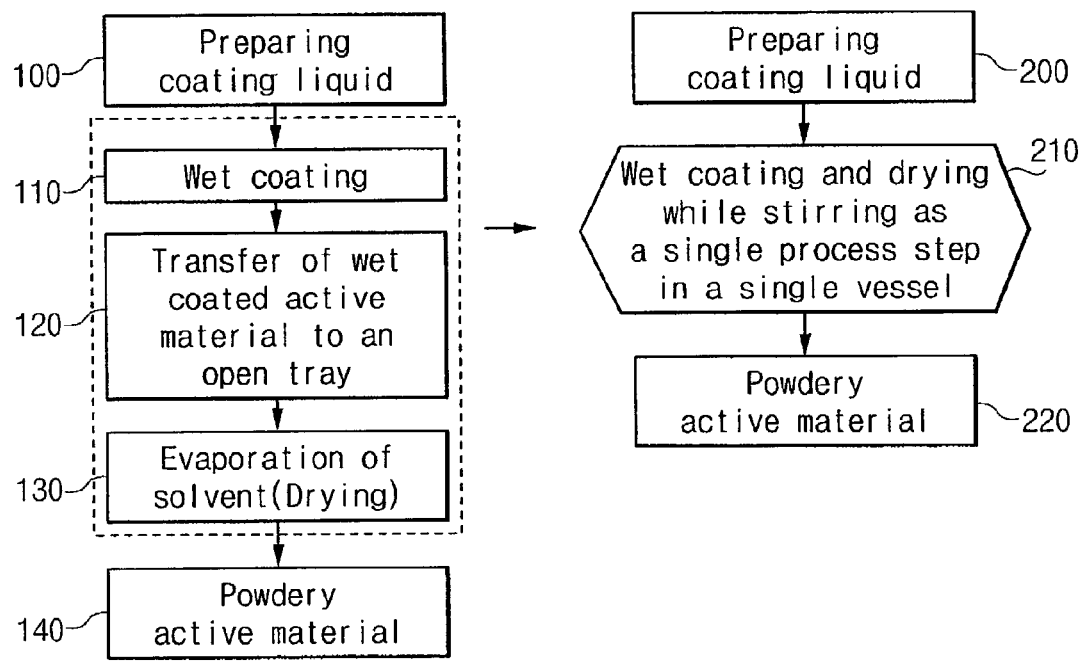
FIGS. 1A and 1B are schematic diagrams illustrating production processes of an active material according to one process and the one-shot process according to embodiments of the present invention.

Reference will now be made in detail to the present embodiments of the present invention, examples of which are illustrated in the accompanying drawings and specific Examples, wherein like reference numerals refer to like elements throughout. The embodiments are described below in order to explain the present invention by referring to the figures and the specific Examples.

The inventor of the present invention has filed U.S. patent application Ser. No. 09/897,445, the disclosure of which is incorporated by reference, wherein an active material is coated with a surface-treatment layer of a metal hydroxide. The active material is coated by coating an organic or an aqueous suspension comprising a metal compound on the active material and drying the coated active material to improve electrochemical performance and thermal stability of the positive active material. While otherwise adequate, the positive active material prepared in accordance with the process of the present invention has superior electrochemical performance in such factors as cycle life, discharge potential, powder capability, etc., and thermal stability to the positive active material prepared according to the process in U.S. patent application Ser. No. 09/897,445.

When a positive electrode is prepared according to a general process, a positive active material, binder material, and conductive agent are mixed in an organic solvent such as N-methyl pyrrolidone to prepare a slurry. The slurry is coated onto an current collector. The coated current collector is dried and compressed. However, the positive active material is not distributed uniformly in the coating. Such non-uniform distribution causes performance deviation of large-scale manufactured electrodes, and as a result of it the reliability of the large-scale manufactured battery may also deteriorate.

In view of this, the present invention provides a process of preparing a surface-treated positive material to enhance reliability of a battery in mass-production. The process of preparing a positive active material for a battery of an embodiment of the present invention comprises:

adding a coating-element source to an organic solvent to prepare a coating-element-containing organic suspension;

adding water to the suspension to prepare a coating liquid;

coating a positive active material with the coating liquid; and drying the coated positive active material.

The positive material of the present invention prepared according to the above process includes a surface-treatment layer comprising at least one compound (hereinafter referred to as a "coating-element-containing compound") selected from the group consisting of a coating-element-containing hydroxide, a coating-element-containing oxyhydroxide, a coating-element-containing oxycarbonate, a coating-element-containing hydroxycarbonate, and a mixture thereof.

For the coating element, any element can be used if it is soluble or suspendable in an organic solvent. According to one example, the coating element is at least one selected from the group consisting of an alkali metal, an alkaline earth metal, a group 13 element, a group 14 element, a group 15 element, and a transition metal. The group 13 element (according to the new IUPAC agreement) refers to the element group including Al of the Periodic Table. The group 14 element (according to the new IUPAC agreement) refers to the element group including Si of the Periodic Table. The group 15 element (according to the new IUPAC agreement) refers to the element group including As of the Periodic Table. In an embodiment of the invention, the coating element includes Mg, Al, Co, K, Na, Ca, Si, Ti, Sn, V, Ge, Ga, B, As, Zr, or a combination thereof, and preferably includes Al or B.

Hereinafter, the process of preparing the positive active material of the present invention is explained in further detail. A coating-element-containing suspension is prepared by adding a coating-element source to an organic solvent. The coating liquid is prepared by adding water to the coating-element-containing organic suspension. In this embodiment of the invention, "coating liquid" refers to a homogeneous suspension or a solution.

The coating-element source includes any coating-element or any coating-element-containing compound that is soluble or suspendable in the organic solvent. The coating-element source may include a coating-element; a coating-element-containing alkoxide such as methoxide, ethoxide, or isopropoxide; a coating-element-containing salt; or a coating-element-containing oxide. When the coating-element source is a coating-element-containing alkoxide, the alkoxide reacts with added water and is hydrolyzed to form hydroxide. The hydrolysis reaction is represented by the following equation:

$$A(OR)_n + 3H_2O \rightarrow A(OH)_n + 3(OR)^{3-} + 3H^+$$

wherein A is a coating element and n is a constant which is determined depending on A and is in the numerical range of 1 to 4.

A suitable type of coating-element-containing compound can easily be chosen by one having ordinary skill in the art. For an example of the coating-element source, tetraethyl orthosilicate may be used as a silicon source, whereas $B_2O_3$, $H_3BO_3$, or $HB(OH)_2$ can be used as a boron source. $HB(OH)_2$ is prepared by dissolving $B_2O_3$ in an organic solvent or water followed by drying the liquid. When vanadium is used as a coating-element, vanadium oxide ($V_2O_5$) or a vanadate such as ammonium vanadate ($NH_4(VO)_3$) may be examples of the coating element source.

Examples of the organic solvents according to embodiments of the invention include, but are not limited to, alcohols such as methanol, ethanol, or isopropanol. Other solvents according to embodiments of the invention include hexane, chloroform, tetrahydrofuran, ether, methylene chloride, and acetone.

The amount of the coating-element source is 0.1 to 50 wt %, and is preferably 5 to 30 wt % of the coating liquid. When the amount is below 0.1 wt %, the coating is not fully effective. When the amount of the coating-element source is more than 50 wt %, the thickness of the resultant surface-treatment layer is difficult to control evenly.

The quantitatively added water to the coating-element-containing organic suspension stabilizes the coating liquid and prevents non-uniform distribution of the surface-treatment layer formed from a reaction between the coating liquid on the surface of the active material and moisture in the atmosphere in the subsequent drying process. The amount of the added water is 0.001 to 20 moles, and preferably is 0.01 to 10 moles per 1 mole of the coating-element source. When the amount of the added water is within the above range, the charge-discharge characteristics and cycle-life characteristics of the battery cell comprising the surface-treated positive active material can be improved. Specifically, when the coating-element source is coating-element-containing alkoxide, the hydrolysis reaction is not carried out when the water is added in an amount of less than 0.001 mole based on 1 mole of the coating-element source. Whereas when the water is added in an amount of more than 20 moles, the hydrolysis reaction is excessively performed and thus a crystalline hydroxide compound is excessively produced in the surface-treatment layer.

The positive active material for the surface treatment includes materials that can undergo reversible electrochemical oxidation-reduction reactions. The reversibly oxidizable and reducible materials include all materials that can reversibly intercalate/deintercalate lithium ions (litigated intercalation compounds). These materials have a basic structure selected from the group consisting of cubic, hexagonal, and monoclinic structures. A conventional lithium-containing compound (lithium-containing metal oxide and lithium-containing chalcogenide compound) may be used as the litigated intercalation compound of the present invention, although the present invention is not limited thereto. Examples are represented in the following formulas (1) to (13):

$$Li_xMn_{1-y}M_yB_2 \qquad (1)$$

$$Li_xMn_{1-y}M_yO_{2-z}X_z \qquad (2)$$

$$Li_xMn_2O_{4-z}X_z \qquad (3)$$

$$Li_xMn_{2-y}M_yB_4 \qquad (4)$$

$$Li_xCo_{1-y}M_yB_2 \qquad (5)$$

$$Li_xCo_{1-y}M_yO_{2-z}X_z \qquad (6)$$

$$Li_xNi_{1-y}M_yB_2 \qquad (7)$$

$$Li_xNi_{1-y}M_yO_{2-z}X_z \qquad (8)$$

$$Li_xNi_{1-y}Co_yO_{2-z}X_z \qquad (9)$$

$$Li_xNi_{1-y-z}Co_yM_zB_\alpha \qquad (10)$$

$$Li_xNi_{1-y-z}Co_yM_zO_{2-\alpha}X_\alpha \qquad (11)$$

$$Li_xNi_{1-y-z}Mn_yM_zB_\alpha \qquad (12)$$

$$Li_xNi_{1-y-z}Mn_yM_zO_{2-\alpha}X_\alpha \qquad (13)$$

wherein
$0.9 \leq x \leq 1.1$; $0 \leq y \leq 0.5$; $0 \leq z \leq 0.5$; $0 \leq \alpha \leq 2$;

M is at least one element selected from the group consisting of Al, Ni, Co, Mn, Cr, Fe, Mg, Sr, V, and rare earth elements;

B is at least one element selected from the group consisting of O, F, S, and P; and X is at least one element selected from the group consisting of F, S, and P.

The average particle size of the litigated intercalation compounds is 1 to 50 μm, and preferably is 5 to 20 μm.

The positive active material is surface-treated (coated) using the coating liquid described above. The coating process may be performed by a dipping method. The dipping method includes dipping the active material in the coating liquid, removing excess liquid, if necessary, and then drying the coated active material. Generally, the dip coating method is used.

Alternatively, the coating process is performed using a single continuous process (hereafter referred to as a "one-shot coating process") in which the mixing of the active material with the coating liquid, the solvent-removing, and the drying take place in a single process vessel. The one-shot coating process comprises mixing the active material with the coating liquid while heating the mixtures of the positive active material and the coating liquid by increasing the process temperature. The coating process further comprises mixing under either a vacuum condition or while injecting purging gas, while increasing the temperature. This one-shot coating process is relatively simple, thereby reducing production costs and making a uniform surface-treatment layer on the active material particles.

The one-shot coating process will be illustrated in further detail. For a better understanding, the coating process using the one-shot coating process is schematically shown in FIG. 1B in comparison with the general coating process schematically shown in FIG. 1A. As shown in FIG. 1A, the general coating technique includes multiple process-operations as described below. In operation 110, an active material is added to the coating liquid in a mixer. The mixer mixes the active material and the coating liquid well to coat the active material with the coating liquid of operation 100. In operation 120, the resulting wet active material with the coating liquid is transferred to a shallow tray to remove the solvent by evaporation. In operation 130, the coated active material is dried in the air at an elevated temperature (for example 80 to 100° C.) to produce the active material 140.

Figure 2:
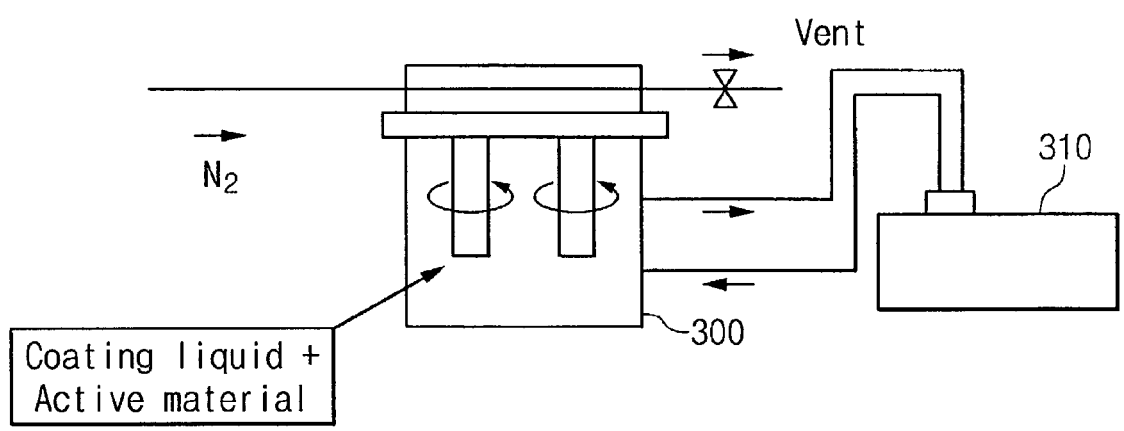
FIG. 2 is a schematic diagram showing an apparatus used in a coating process according to another embodiment of the present invention.

On the other hand, the one-shot coating process shown in FIG. 1B involves preparing a coating liquid (operation 200), putting the coating liquid and the active material into a mixer and raising the temperature of a mixer 300 (shown in FIG. 2) while the contents are being agitated during mixing (operation 210). Simultaneously, a purging gas is introduced into the mixer 300, which is schematically shown in FIG. 2. The purging gas facilitates the evaporation of the solvent of the coating liquid and purges impure gases that may be present in the mixer 300. The purging gas may be $CO_2$, or a moisture-free inert gas such as nitrogen or argon. In this coating process, the active material is coated with the coating liquid in the mixer 300, and the solvent of the coating liquid is evaporated and removed while the process mixture is being continuously stirred. The solvent removal process is accelerated as the temperature is raised. Therefore, the transfer of the liquid-coated wet active material to another vessel (a tray) and the separate drying operation (operations 120 and 130) in the tray can be combined into a single continuous process step in a single vessel.

While not required, after putting the active material and the coating liquid in the mixer 300, a premixing process may be further performed in a reduced period of process time to obtain a uniform mixture.

The temperature of the mixer 300 is raised to 50 to 100° C., for example, by circulating hot water through the outside wall of the mixer 300 to accelerate the evaporation of the solvent such as alcohol or water using a heat exchanger 310. The type of mixer 300 is not limited to any one type as long as it is capable of mixing the active material with the coating liquid effectively, injecting the purging gas if used, and raising the temperature to a desired value. A representative example of the mixer 300 is a planetary mixer.

Subsequent to the wet coating, the coated active material is dried to form the resultant active material for a battery of the present invention. The resultant active material includes the surface-treatment layer comprising a coating-element-containing compound such as a coating-element-containing hydroxide, a coating-element-containing oxyhydroxide, a coating-element-containing oxycarbonate, a coating-element-containing hydroxycarbonate, and a mixture thereof.

The drying operations are performed at a temperature in the range of room temperature (i.e., roughly 20° C.) to 200° C., for 1 to 24 hours. When the drying temperature is lower than room temperature, the drying time is unduly prolonged. If the drying temperature is too high, e.g., much higher than 200° C., the desired quality of the surface-treatment layer may not be achieved. When the drying duration is too short or too long, e.g., much shorter than 1 hour or much longer than 24 hours, the desired quality of the surface-treatment layer may not be obtained due to the formation of an undesirable crystal structure or morphology. However, it is understood that other temperature and time ranges may be used in order to obtain a desired coating.

When using the one-shot coating process in FIG. 1B, because the drying operation is performed simultaneously with the coating operations, a separate drying operation 130 is not necessary after the coating process 110 as in the operation of FIG. 1A.

During the drying operations 130 and 210, the coating element in the coating liquid on the surface of the active material may react with moisture in the atmosphere to produce a hydroxide and/or convert to other forms of the coating compound. Thus, the surface-treatment layer may include a new amorphous or crystalline coating-element-containing hydroxide, coating-element-containing oxyhydroxide, a coating-element-containing oxycarbonate, or a coating-element-containing hydroxidecarbonate due to a partial dehydration of the coating-element-containing hydroxides, reaction with atmospheric carbon dioxide ($CO_2$), or both.

The final form of active material is coated with the surface-treatment layer including the coating-element-containing compound which has a phase selected from the group consisting of amorphous, semi-crystalline, crystalline, and mixtures thereof. The amount of the added water can also control the crystallinity of the coating-element-containing compound. As the amount of the added water increases, the crystallinity of the compound becomes higher.

The amount of the coating element is in a range of $2 \times 10^{-4}$ to 4 wt %, and preferably in the range of 0.001 to 2 wt % of the active material. When the amount thereof is below $2 \times 10^{-4}$ wt %, the effect of coating may not be sufficiently high to be effective. When the amount of the coating element is above 4 wt %, the electrode capacity may reduce proportionally due to the added weight of the coated compound.

The thickness of the surface-treatment layer is in the range of 1 to 300 nm, preferably 1 to 100 nm, and more preferably 1 to 50 nm. When the thickness is less than 1 nm, the effect of the surface-treatment layer on the battery performance may be insufficient. When the thickness is more than 300 nm, the thickness is too thick to facilitate the movement of $Li^+$ ions through the coating layer to improve the battery performance.

The surface-treatment layer of the positive active material improves discharge potential characteristics at various current densities. When applying the positive active material of the present invention to a battery cell, it is anticipated to enhance the power capability of the battery cell and also provide for good cycle-life for the battery cell. The surface-treated positive active material also reduces the swelling of the cell dimension due to gas generation within the cell due to a reduced reaction of the coated active material with the electrolyte, thereby also improving safety of the battery cell.

In the present invention, in contrast to the state-of the-art modification technique of positive active material, heat-treatment is not carried out. Thus, the surface-treated positive active material is manufactured by a simplified operation of the present invention. The omission of the heat-treatment operation reduces the manufacturing time and cost and thus improves manufacturing productivity with reduced process cost. Since the heat-treatment is not performed, the powders of the final product of the positive active material are not made of agglomerated powders and thus a pulverizing process is not necessary.

The coated active material powder may or may not be sieved to obtain a powder with a desirable average diameter. When a sieving process is not used, a small portion of the coating material powder which originated from the dried coating liquid may remain with the final active material. The small amount of such powder improves the thermal stability of the electrode.

The surface treatment (coating) technique of the active material with the coating-element-containing compound of the present invention is applicable to the active material for many different types of batteries. The surface treatment is effective in improving the performance characteristics of the active materials for both the positive electrodes and the negative electrodes.

In the present invention, a surface-treatment layer comprising at least one coating-element-containing compound is formed on the surface of the active material. The coating-element-containing compound is selected from the group consisting of a coating-element-containing hydroxide, a coating-element-containing oxyhydroxide, a coating-element-containing oxycarbonate, a coating-element-containing hydroxycarbonate, and a mixture thereof. The coating-element-containing compound has an amorphous, a semi-crystalline or a crystalline phase or a mixture of these phases.

The positive active material is applied to a positive electrode of a lithium secondary battery as follows: a positive active material slurry is prepared by mixing the positive active material, binder material, and conductive agent in an organic solvent. The positive electrode is generally fabricated by casting (coating) the slurry on a current collector drying it, and then compressing the coated current collector.

Figure 3:
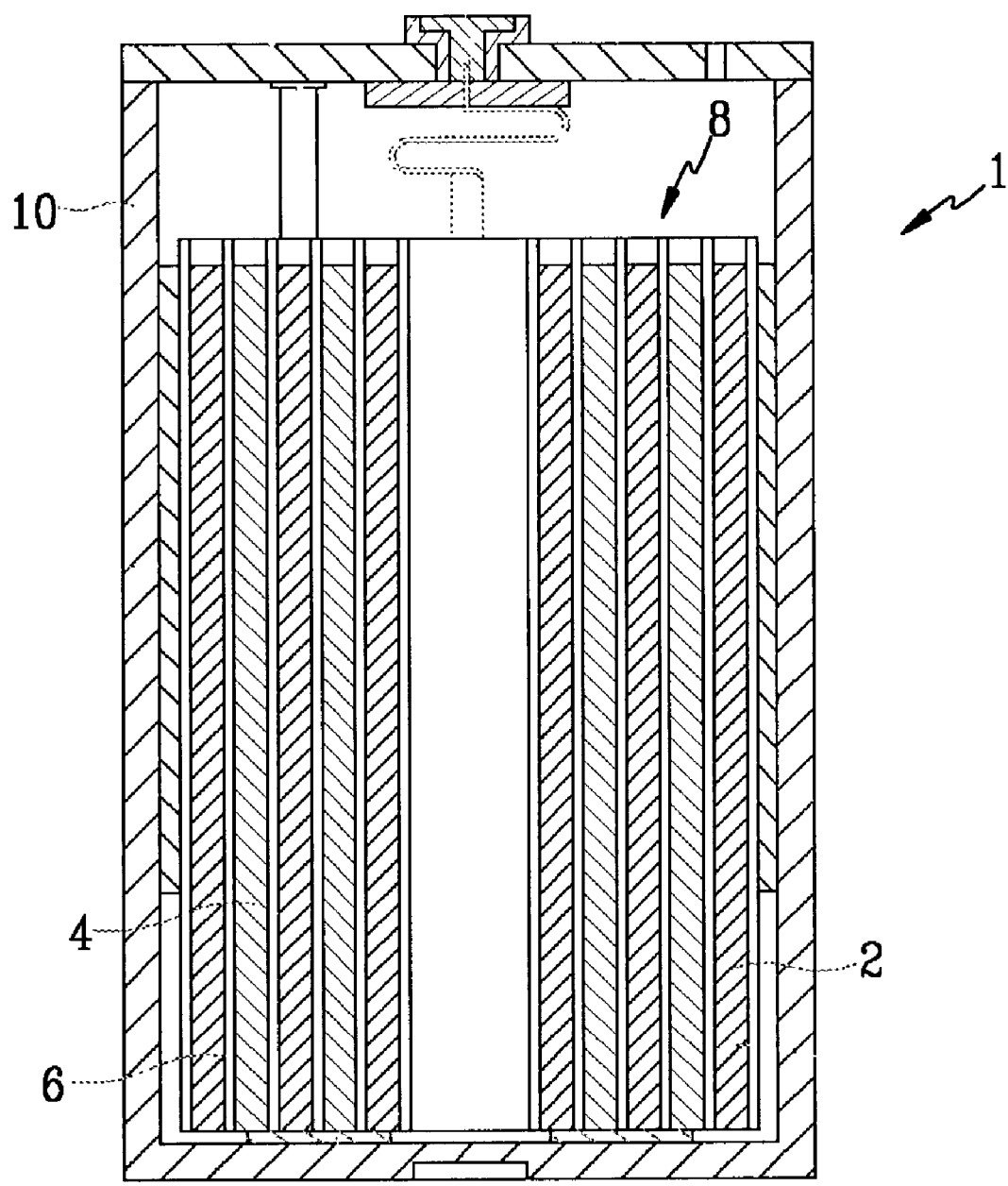
FIG. 3 illustrates a cross-sectional view of a lithium secondary battery cell.

A cross-sectional view of a prismatic lithium secondary battery cell according to an embodiment of the present invention is illustrated in FIG. 3. As shown in FIG. 3, the lithium secondary battery 1 is fabricated by the following process. An electrode assembly 8 is prepared by winding a positive electrode 2, a negative electrode 4, and a separator 6 interposed between the positive and negative electrodes 2, 4, then placing the electrode assembly 8 into a battery case 10. An electrolyte is injected in the case 10. The upper part of the battery case 10 is then sealed. In the battery, a conventional negative electrode 4 and electrolyte can be used. The negative electrode 4 comprises a material that can reversibly deintercalate/intercalate lithium ions, such as a carbonaceous material. The electrolyte comprises lithium salts and organic solvents. It is understood that other types of batteries can be constructed using the coated active material of the present invention. Further, it is understood that, where the separator 6 is a solid electrolyte, the separator 6 and the electrolyte need not be included separately.

The advantage of the present invention is that the chemical and/or electrochemical stability of the electrolyte/active material interface is improved substantially by the presence of the coating-element-containing compound. The improvement of such stability, in turn, improves the cycle life of the electrode as well as reduces the rate of undesirable gas generation in the cell that builds up internal pressure in the cell. These improvements in cycle life as well as in gas generation are due to a reduction of an irreversible oxidation reaction of the electrolyte at the surface of the charged active material, due to the presence of the coating layer.

The present invention is further explained in more detail with reference to the following examples. These examples, however, should not in any sense be interpreted as limiting the scope of the present invention.

COMPARATIVE EXAMPLE 1

$LiCoO_2$ powder for a positive active material (average particle diameter: 10 µm) and Super P for a conductive agent were mixed in a polyvinylidene fluoride binder solution to prepare a positive active material slurry. The weight ratio of the $LiCoO_2$ powder, the Super P, and the polyvinylidene fluoride was 96:2:2. The positive active material slurry was cast onto an Al foil in a thickness of about 100 µm followed by drying and compressing the coated Al foil. The resultant slurry-coated Al foil was cut into a disk having a diameter of 1.6 cm to prepare a positive electrode.

Using the positive electrode and a lithium counter electrode, a coin-type half-cell was fabricated in an Ar-purged glove box. For the electrolyte, a 1 M $LiPF_6$ solution in ethylene carbonate and dimethyl carbonate (1:1 volume ratio) was used.

COMPARATIVE EXAMPLE 2

A coin-type half-cell was fabricated by the same procedure as in Comparative Example 1, except that $LiMn_2O_4$ powder was used instead of $LiCoO_2$ powder.

COMPARATIVE EXAMPLE 3

A coin-type half-cell was fabricated by the same procedure as in Comparative Example 1, except that $LiNi_{0.9}Sr_{0.002}Co_{0.1}O_2$ powder was used instead of $LiCoO_2$ powder.

COMPARATIVE EXAMPLE 4

A 1 wt % of Al-isopropoxide coating suspension was prepared by adding 1 g of Al-isopropoxide powder to 99 g of ethanol. $LiCoO_2$ powder (average particle diameter: 10 µm) was added to the Al-isopropoxide suspension, followed by mixing it thoroughly to coat the surface of the $LiCoO_2$ powder with the suspension. From the resulting coated material, the solvent was evaporated and then the material was dried at 100° C. for about 12 hours in an oven. The dried material was heat-treated at about 500° C. for approximately 10 hours while purging dry air to prepare a positive active material, an $LiCoO_2$ powder with an $Al_2O_3$ surface-treatment layer.

The resultant coated $LiCoO_2$ powder for a positive active material (average particle diameter: 10 µm) and Super P for a conductive agent were mixed in a polyvinylidene fluoride binder solution to prepare a positive active material slurry.

The weight ratio of $LiCoO_2$ powder, Super P, and polyvinylidene fluoride was 94:3:3. The positive active material slurry was cast onto an Al foil in a thickness of about 100 μm followed by drying and compressing the coated Al foil. The resultant slurry-coated Al foil was cut into a disk having a diameter of 1.6 cm to prepare a positive electrode.

Using the positive electrode and a lithium counter electrode, a coin-type half-cell was fabricated in an Ar-purged glove box. For the electrolyte, a 1 M $LiPF_6$ solution in ethylene carbonate and dimethyl carbonate (1:1 volume ratio) was used.

COMPARATIVE EXAMPLE 5

A coin-type half-cell was fabricated by the same procedure as in Comparative Example 4, except that a $LiMn_2O_4$ powder was used instead of the $LiCoO_2$ powder.

COMPARATIVE EXAMPLE 6

A coin-type half-cell was fabricated by the same procedure as in Comparative Example 4, except that a $LiNi_{0.9}Sr_{0.002}Co_{0.1}O_2$ powder was used instead of the $LiCoO_2$ powder.

COMPARATIVE EXAMPLE 7

A coin-type half-cell was fabricated by the same procedure as in Comparative Example 4, except that a $Li_{1.03}Ni_{0.69}Mn_{0.19}Co_{0.1}Al_{0.07}Mg_{0.07}O_2$ powder was used instead of the $LiCoO_2$ powder.

REFERENCE EXAMPLE 1

1 wt % Al-isopropoxide coating suspension was prepared by adding 1 g of Al-isopropoxide powder to 99 g of ethanol. $LiCoO_2$ powder (average particle diameter: 10 μm) was added to the Al-isopropoxide coating suspension, followed by mixing it thoroughly for about 30 minutes in a mixer with a water-jacketed heat exchanger to coat the surface of the $LiCoO_2$ powder with the suspension. Purging nitrogen gas was injected into the mixer while the mixer chamber temperature was kept at 60° C. by circulating hot water through the heat exchanger. The mixture was stirred continuously for an additional hour while dry nitrogen gas was flowing continuously to remove the ethanol by evaporation and to thereby obtain a coated $LiCoO_2$ active material powder with a layer of $Al(OH)_3$.

The resultant coated $LiCoO_2$ powder for a positive active material (average particle diameter: 10 μm) and Super P for a conductive agent were mixed in a polyvinylidene fluoride binder solution to prepare a positive active material slurry. The weight ratio of the $LiCoO_2$ powder, the Super P, and the polyvinylidene fluoride was 96:2:2. The positive active material slurry was cast onto an Al foil in a thickness of about 100 μm followed by drying and compressing the coated Al foil. The resultant slurry-coated Al foil was cut into a disk having a diameter of 1.6 cm to prepare a positive electrode.

Using the positive electrode and a lithium counter electrode, a coin-type half-cell was fabricated in an Ar-purged glove box. For the electrolyte, a 1 M $LiPF_6$ solution in ethylene carbonate and dimethyl carbonate (1:1 volume ratio) was used.

REFERENCE EXAMPLE 2

A coin-type half-cell was fabricated by the same procedure as in Reference Example 1, except that a 5 wt % Al-isopropoxide coating suspension was used instead of the 1 wt % Al-isopropoxide coating suspension.

REFERENCE EXAMPLE 3

A coin-type half-cell was fabricated by the same procedure as in Reference Example 1, except that a 10 wt % Al-isopropoxide coating suspension was used instead of the 1 wt % Al-isopropoxide coating suspension.

EXAMPLE 1

A 1 wt % Al-isopropoxide suspension was prepared by adding 1 g (0.005 mole) of Al-isopropoxide powder to 99 g of ethanol followed by addition of 0.0005 mole of water to the suspension to prepare a coating liquid. The ethanol used was a 99.9% pure grade (supplied by J. T. BAKER CHEMICAL COMPANY). The added water in the coating liquid reacted with the Al-isopropoxide to produce a compound of $Al(OH)_3$. $LiCoO_2$ powder (average particle diameter: 10 μm) was added to the coating liquid, followed by mixing it thoroughly for about 30 minutes in a mixer with a water-jacketed heat exchanger to coat the surface of the $LiCoO_2$ powder with the suspension. Purging nitrogen gas was injected into the mixer while the mixer chamber temperature was kept at 60° C. by circulating hot water through the heat exchanger. The mixture was stirred continuously for an additional 1 hour while dry nitrogen gas was flowing continuously to remove the ethanol by evaporation and to thereby obtain a coated $LiCoO_2$ active material powder with a layer of $Al(OH)_3$.

The coated $LiCoO_2$ powder and the Super P for a conductive agent were pre-mixed, and the resultant mixture was added to a polyvinylidene fluoride binder solution. The weight ratio of the coated $LiCoO_2$ powder, the Super P, and the polyvinylidene fluoride was 96:2:2. The mixture in an appropriate amount of the N-methyl pyrrolidone (NMP) solvent was mixed thoroughly, to prepare a positive active material slurry. The positive active material slurry was cast onto an Al foil in a thickness of about 100 μm followed by drying and compressing the coated Al foil. The resultant slurry-coated Al foil was cut into a disk having a diameter of 1.6 cm to prepare a positive electrode.

Using the positive electrode and the lithium counter electrode, a coin-type half-cell was fabricated in an Ar-purged glove box. For the electrolyte, a 1 M $LiPF_6$ solution in ethylene carbonate and dimethyl carbonate (1:1 volume ratio) was used.

EXAMPLE 2

A coin-type half-cell was fabricated by the same procedure as in Example 1, except that the coating liquid was prepared by adding 0.005 mole of water to a 1 wt % Al-isopropoxide suspension.

EXAMPLE 3

A coin-type half-cell was fabricated by the same procedure as in Example 1, except that the coating liquid was prepared by adding 0.05 mole of water to a 1 wt % Al-isopropoxide suspension.

EXAMPLE 4

LiCoO$_2$ powder (average particle diameter: 10 μm) was added to the coating liquid prepared by the same procedure as in Example 1 followed by mixing it thoroughly to coat the surface of the LiCoO$_2$ powder with the suspension. From the resulting coated material, solvent was evaporated and then the material was dried at 100° C. for about 12 hours in an oven to prepare a positive active material, the LiCoO$_2$ powder, with a layer of Al(OH)$_3$.

Using the resultant coated LiCoO$_2$ powder for a positive active material, a coin-type half-cell was fabricated by the same procedure as in Example 1.

EXAMPLE 5

A coin-type half-cell was fabricated by the same procedure as in Example 1, except that the coating liquid was prepared by adding 5 g (0.025 mole) of Al-isopropoxide powder to 95 g of ethanol to prepare a 5 wt % Al-isopropoxide suspension, followed by the addition of 0.0025 mole of water to the suspension to prepare the coating liquid.

EXAMPLE 6

A coin-type half-cell was fabricated by the same procedure as in Example 1, except that the coating liquid was prepared by adding 5 g (0.025 mole) of Al-isopropoxide powder to 95 g of ethanol to prepare a 5 wt % Al-isopropoxide suspension, followed by the addition of 0.025 mole of water to the suspension to prepare the coating liquid.

EXAMPLE 7

A coin-type half-cell was fabricated by the same procedure as in Example 1, except that the coating liquid was prepared by adding 5 g (0.025 mole) of Al-isopropoxide powder to 95 g of ethanol to prepare a 5 wt % Al-isopropoxide suspension, followed by the addition of 0.25 mole of water to the suspension to prepare the coating liquid.

EXAMPLE 8

A coin-type half-cell was fabricated by the same procedure as in Example 1, except that the coating liquid was prepared by adding 10 g (0.05 mole) of Al-isopropoxide powder to 90 g of ethanol to prepare a 10 wt % Al-isopropoxide suspension, followed by the addition of 0.005 mole of water to the suspension to prepare the coating liquid.

EXAMPLE 9

A coin-type half-cell was fabricated by the same procedure as in Example 1, except that the coating liquid was prepared by adding 10 g (0.05 mole) of Al-isopropoxide powder to 90 g of ethanol to prepare a 10 wt % Al-isopropoxide suspension, followed by the addition of 0.05 mole of water to the suspension to prepare the coating liquid.

EXAMPLE 10

A coin-type half-cell was fabricated by the same procedure as in Example 1, except that the coating liquid was prepared by adding 10 g (0.05 mole) of Al-isopropoxide powder to 90 g of ethanol to prepare a 10 wt % Al-isopropoxide suspension, followed by the addition of 0.5 mole of water to the suspension to prepare the coating liquid.

EXAMPLE 11

A coin-type half-cell was fabricated by the same procedure as in Example 1, except that LiMn$_2$O$_4$ powder was used instead of the LiCoO$_2$ powder.

EXAMPLE 12

A coin-type half-cell was fabricated by the same procedure as in Example 1, except that LiNi$_{0.9}$Sr$_{0.002}$Co$_{0.1}$O$_2$ powder was used instead of the LiCoO$_2$ powder.

EXAMPLE 13

A coin-type half-cell was fabricated by the same procedure as in Example 1, except that Li$_{1.03}$Ni$_{0.69}$Mn$_{0.19}$Co$_{0.1}$Al$_{0.07}$Mg$_{0.07}$O$_2$ powder was used instead of the LiCoO$_2$ powder.

Figure 4A:
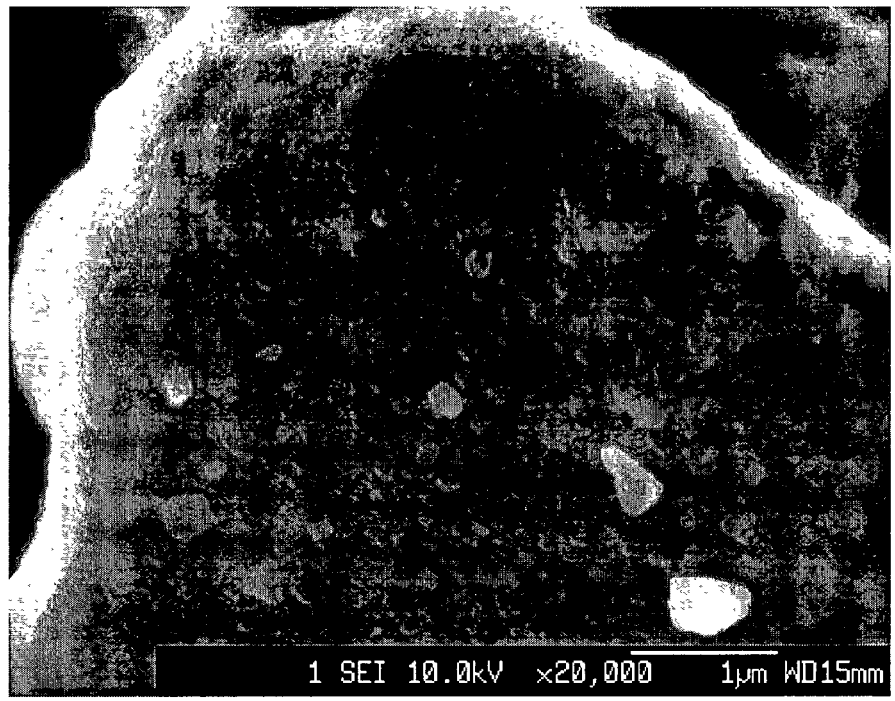
FIGS. 4A to 4D are Scanning Electron Microscopy (SEM) photographs of a positive active material powder according to Examples 6 and 7 of the present invention, Reference Example 2, and Comparative Example 1, respectively.
Figure 4B:
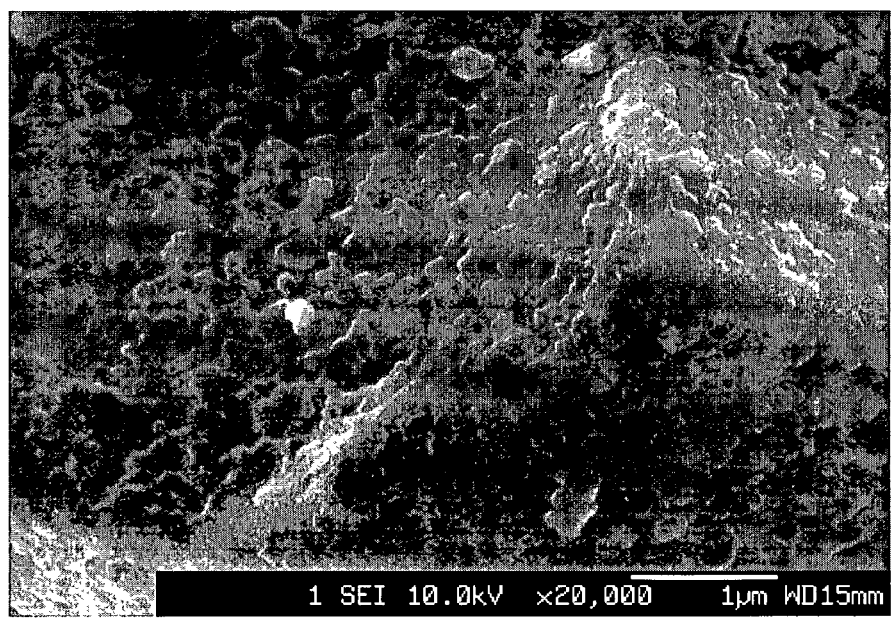
Figure 4C:
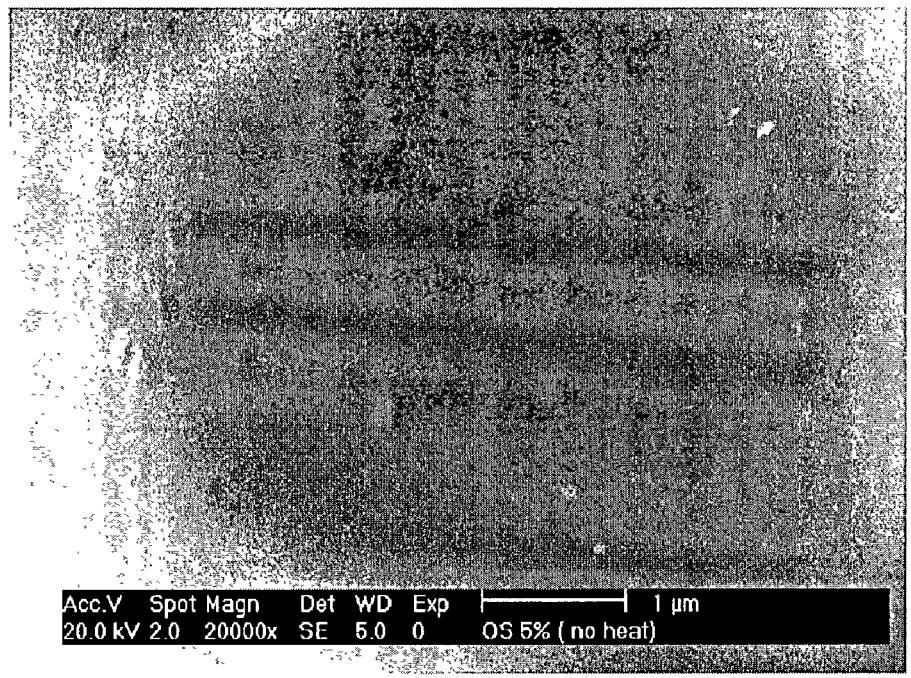
Figure 4D:
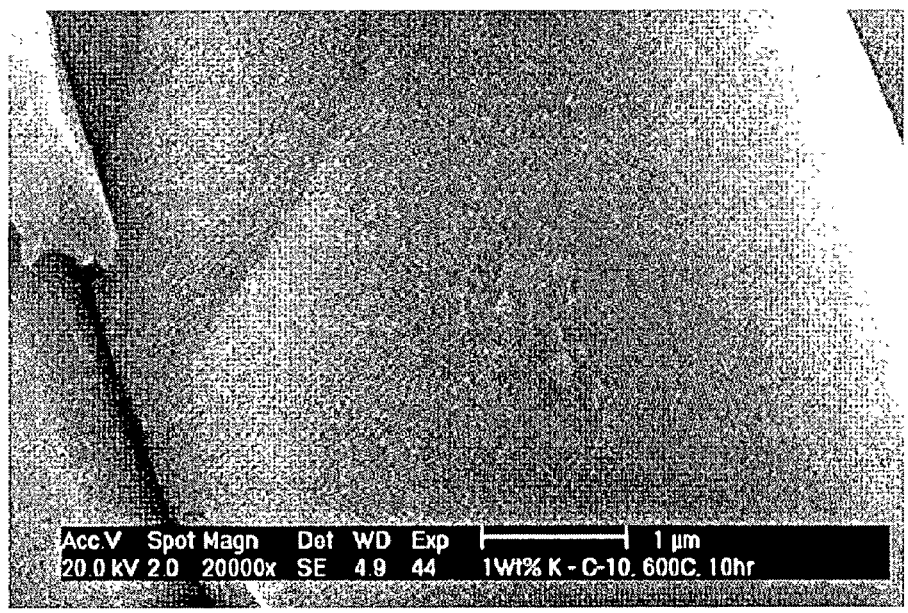

In order to evaluate the surface morphology, SEM photographs of the LiCoO$_2$ active materials prepared according to Examples 6 and 7 of the present invention are shown in FIGS. 4A and 4B, respectively. Additionally, SEM photographs of the LiCoO$_2$ active materials prepared according to Reference Example 2 and Comparative Example 1 are shown in FIGS. 4C and 4D. As shown in FIGS. 4A to 4D, the surfaces of the LiCoO$_2$ active materials prepared according to Examples 6 and 7 are rougher than those of Reference Example 2 and Comparative Example 1. Deposits of particulate type lumps are visible on the surface of the active materials of Examples 6 and 7 that were surface-treated with a coating liquid of added water while the surface of the active materials of Reference Example 2 that were surface-treated with a coating liquid without added water looks smooth. The particulate looking material is apparently a crystalline material whose crystallinity increases as the water content in the coating liquid increases.

Figure 5:
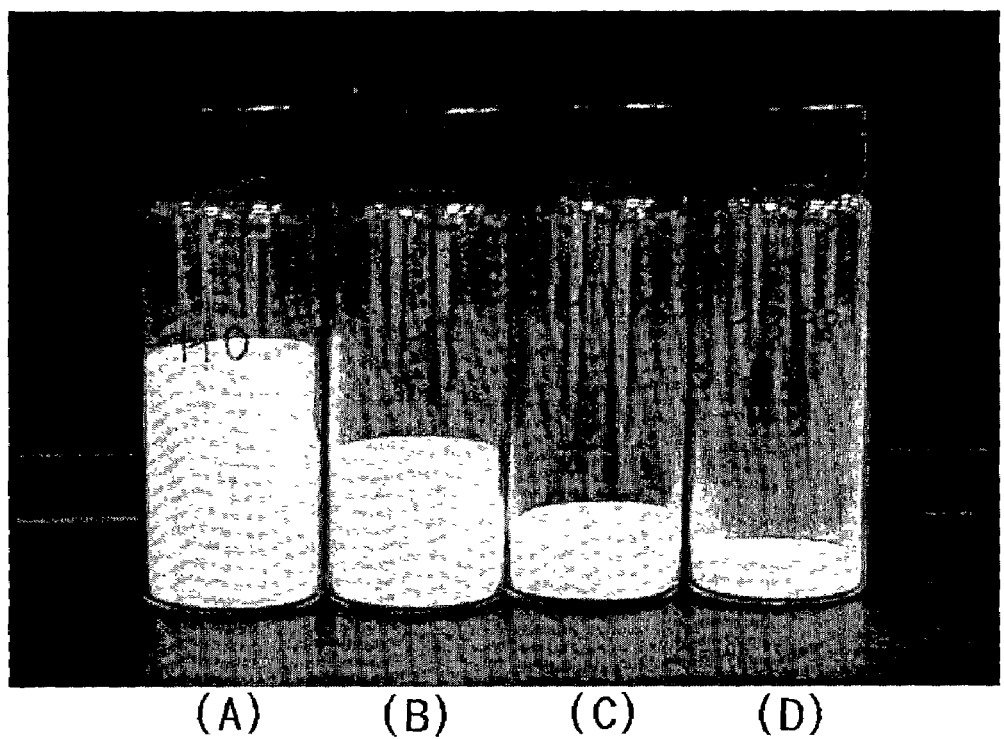
FIG. 5 illustrates photographs of the powders prepared by drying coating liquids of Reference Example 1 (A), Example 2 (B), and Example 3 (C), respectively and the powders prepared by drying an aqueous suspension comprising Al-isopropoxide powder and water solvent (D)

In order to verify that the surface crystallinity increases as the water content increases, the coating liquids prepared from Al-isopropoxide containing various amounts of water are dried under a similar condition of 100° C. for 12 hours to produce resultant compound powders in a similar method to the Al-containing coating compound that is present on the finally produced active materials in the above Reference Examples and Examples. The resultant compound powders are shown in FIG. 5. In FIG. 5, (A) shows the powder prepared by drying the coating liquid of Reference Example 1; (B) shows the powder prepared by drying the coating liquid of Example 2; (C) shows the powder prepared by drying the coating liquid of Example 3; and (D) shows the powder prepared by drying an aqueous suspension consisting of 1 g of Al-isopropoxide powder and 99 g of water solvent. Although the amounts of the Al-isopropoxide are the same in all of these samples, the results shown in FIG. 5 indicate that as the amount of water added increases (from (A) to (D)), the volume of dried powder produced decreases.

Figure 6:
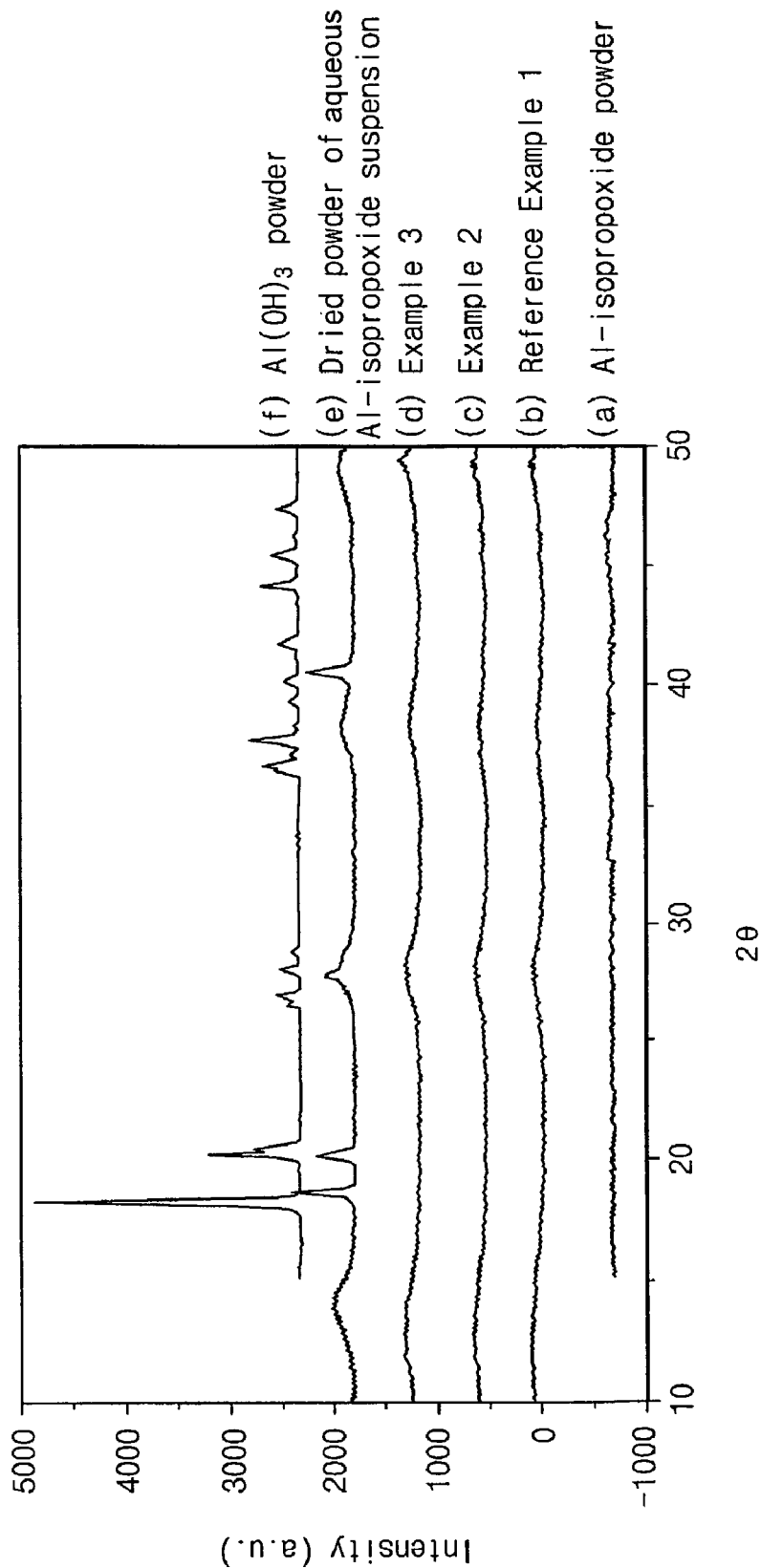
FIG. 6 illustrates X-ray diffraction peaks of (a) commercial Al-isopropoxide powder, (b) dried powder of coating liquid in accordance with Reference Example 1, (c) dried powder of coating liquid in accordance with Example 2, (d) dried powder of coating liquid in accordance with Example 3, (e) dried powder of an aqueous suspension comprising Al-isopropoxide powder and water solvent, and (f) commercial $Al(OH)_3$ powder.

FIG. 6 illustrates X-ray diffraction (XRD) analysis results of the powders obtained from the coating liquids. In FIG. 6, (a) shows XRD peaks of a commercial Al-isopropoxide powder (manufactured by ALDRICH CO.); (b) shows XRD peaks of the dried powder of the coating liquid in accordance with Reference Example 1; (c) shows XRD peaks of the dried powder of the coating liquid in accordance with Example 2; (d) shows XRD peaks of the dried powder of the coating liquid in accordance with Example 3; (e) shows XRD peaks of the dried powder of an aqueous suspension consisting of 1 g of Al-isopropoxide powder and 99 g of water solvent; and (f) shows XRD peaks of commercial Al(OH)$_3$ powder (manufactured by JUNSEI CO.). As shown in FIG. 6, the amount of water in the coating liquid increases, the crystallinity of the dried powder is increased and the XRD peak pattern becomes closer to that of commercial Al(OH)$_3$ powder (f).

Figure 7A:
FIGS. 7A and 7B are photographs showing dried states of positive active material slurries contained in trays in accordance with Reference Example 2 and Example 2, respectively.
Figure 7B:
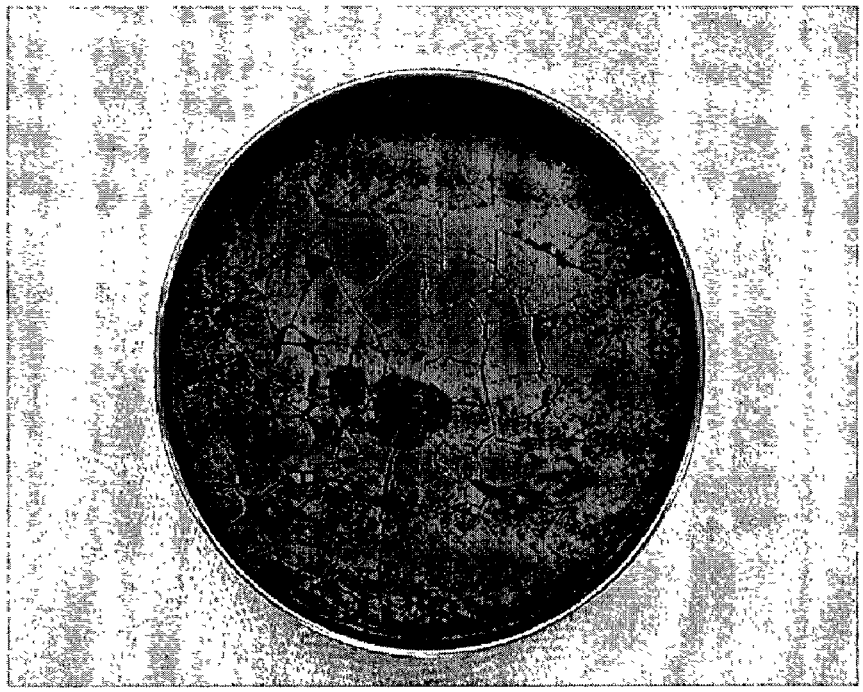

FIGS. 7A and 7B are photographs showing powders obtained by drying the positive active material slurries contained in trays in accordance with Reference Example 2 and Example 2, respectively, at the drying temperature of 100° C. As shown FIG. 7A, there was a white layer on the surface of the powder prepared by drying the positive active material slurry contained in the tray in accordance with Reference Example 2. This indicates that the distribution of the slurry was not uniform. However, as shown in FIG. 7B, there was no such white layer on the surface of the powder prepared by drying the positive active material slurry contained in the tray in accordance with Example 2, which indicates that the distribution of the slurry was uniform. In addition, the powder obtained by drying the positive active material slurry of Example 2 feels softer than that of Reference Example 2.

Figure 8:
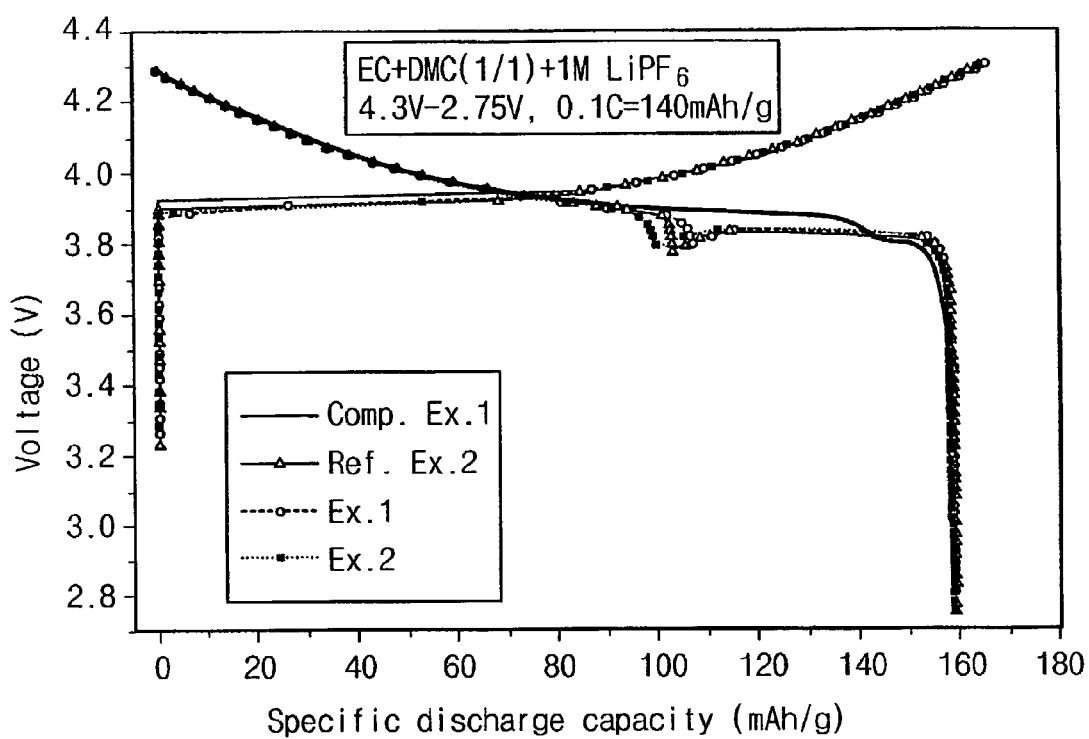
FIG. 8 is a graph showing charge and discharge characteristics at the rate of 0.1 C of the battery cells according to Comparative Example 1, Reference Example 2, and Examples 1 and 2 of the present invention, respectively.
Figure 9:
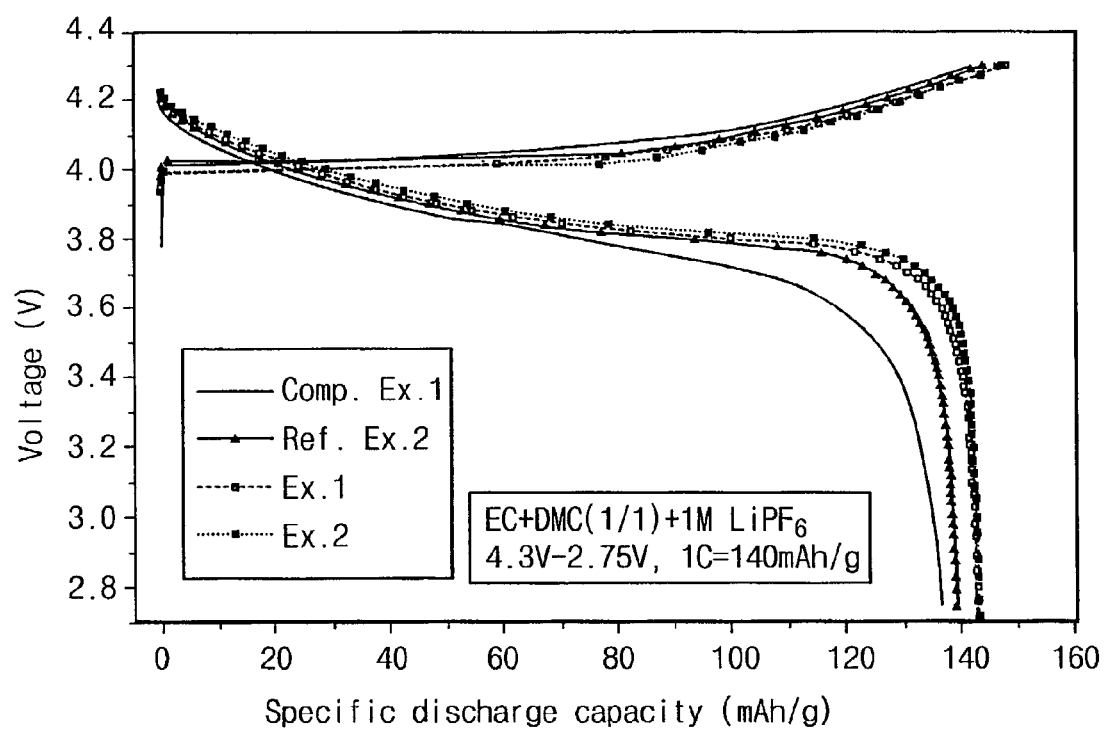
FIG. 9 is a graph showing charge and discharge characteristics at the rate of 1 C of the battery cells according to Comparative Example 1, Reference Example 2, and Examples 1 and 2 of the present invention, respectively.

In order to evaluate the discharge characteristics of the coin-type half-cells of Comparative Examples, Reference Examples, and Examples at various rates, the cells were charged-discharged in the voltage range of 4.3 to 2.75 V. Results of the charge-discharge characteristics at various current densities (0.1 C and 1 C) of Comparative Example 1, Reference Example 2, and Examples 1 and 2 of the present invention are respectively shown in FIGS. 8 and 9. As shown in FIG. 8, the discharge characteristics of the cells of Examples 1 and 2 do not differ from those of Comparative Example 1 or Reference Example 2 at a low rate. However, the cells comprising the LiCoO$_2$ powders of Example 1 and 2 are superior in discharge characteristics (i.e., in discharge potential and discharge capacity), to those of Comparative Example 1 and Reference Example 2, as shown in FIG. 9. When the current density is increased from a low rate (0.2 C) to a high rate (1.0 C), the superiority is particularly pronounced.

Figure 10:
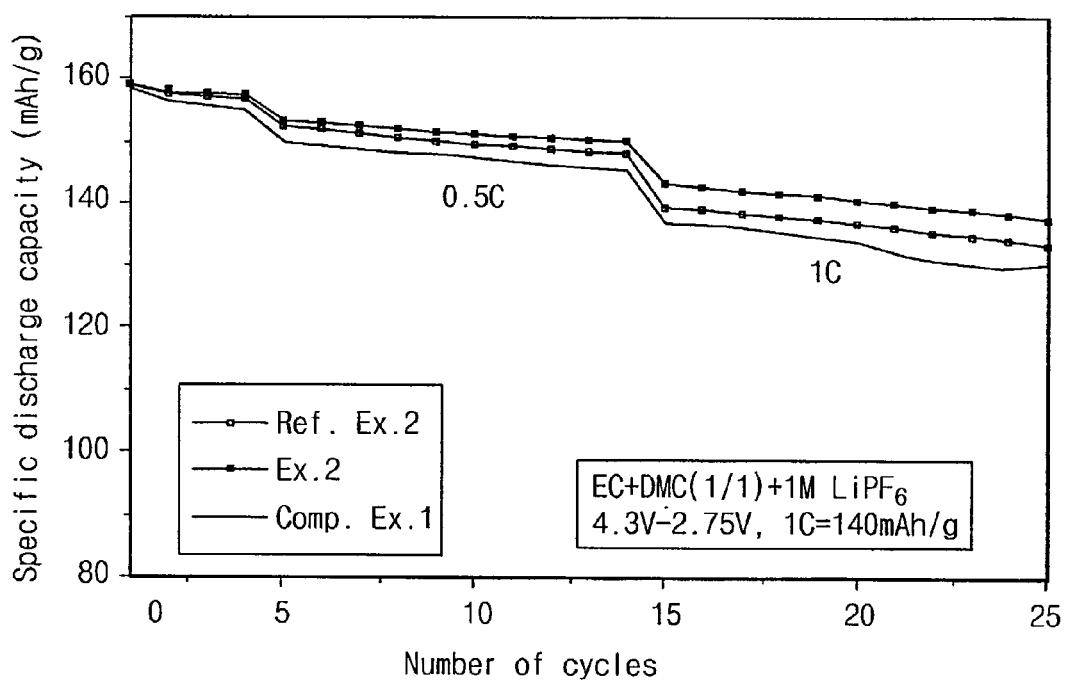
FIG. 10 is a graph showing cycle life characteristics of battery cells according to Comparative Example 1, Reference Example 2, and Example 2 of the present invention, respectively.

FIG. 10 shows the results of charge-discharge cycling of the cells of Comparative Example 1, Reference Example 2, and Example 2 of the present invention at a 0.1 C rate (1 cycle), a 0.2 C rate (3 cycles), a 0.5 C rate (10 cycles), and a 1 C rate (10 cycles) in the voltage range of 4.3V to 2.75V. As indicated in FIG. 10, the positive active material of Example 2 has superior cycle-life characteristics to those of Comparative Example 1 and Reference Example 2.

The surface-treatment layer formed on the positive active material of the present invention comprising at least one coating-element-containing compound selected from the group consisting of a coating-element-containing hydroxide, a coating-element-containing oxyhydroxide, a coating-element-containing oxycarbonate, a coating-element-containing hydroxycarbonate, and a mixture thereof has high ion conductivity, and the internal resistance is improved significantly in a battery cell containing the surface-treated positive active material over one without the coating, resulting in an improvement of the discharge potential. It is thereby anticipated to enhance the power capability of the battery cell and to also provide good cycle-life to the battery cell. The surface-treatment layer prevents the side reaction between the positive active material and electrolyte, and thus the gas generation inside the battery is reduced, resulting in a lessening of the swelling phenomenon and enhancement of safety characteristics. In large-scale production, there is no decline among produced positive active materials in terms of characteristics that affect cell performance, resulting in an improvement in reliability. Therefore, the present invention is suitable for mass-production of a positive active material.

While the present invention has been described in detail with reference to the embodiments, those skilled in the art will appreciate that various modifications and substitutions can be made thereto without departing from the spirit and scope of the present invention as set forth in the accompanying claims and equivalents thereof.

What is claimed is:

1. A surface-treated positive active material comprising:
a positive active material; and
a surface-treatment layer formed on the positive active material including at least one compound selected from the group consisting of a coating-element-containing hydroxide, a coating-element-containing oxyhydroxide, a coating-element-containing oxycarbonate, a coating-element-containing hydroxycarbonate, and a mixture thereof,
wherein the surface-treatment layer is formed on the positive active material by a process comprising:
adding a coating element or a coating-element-containing compound to an organic solvent to prepare an organic suspension;
adding water to the suspension to prepare a coating liquid;
coating the positive active material with the coating liquid; and
drying the coated positive active material, thereby forming the surface-treatment layer on the positive active material, and
wherein the coating element is at least one selected from a group consisting of an alkali metal, an alkaline earth metal, a group 13 element of the Periodic Table, a group 14 element of the Periodic Table, a group 15 element of the Periodic Table, a transition metal, and a combination thereof.

2. The surface-treated positive active material as claimed in claim 1, wherein the surface-treatment layer has a phase selected from the group consisting of an amorphous phase, a semi-crystalline phase, a crystalline phase, and a mixture thereof.

3. The surface-treated positive active material as claimed in claim 1, wherein the surface-treatment layer has a thickness in a range of 1 and 300 nm.

4. The surface-treated positive active material as claimed in claim 3, wherein the surface-treatment layer has a thickness in a range of 1 and 50 nm.

5. The surface-treated positive active material as claimed in claim 1, wherein an amount of the coating element is in a range of $2 \times 10^{-4}$ and 4% by weight of the positive active material.

6. The surface-treated positive active material as claimed in claim 5, wherein an amount of the coating element is in a range of 0.001 and 2% by weight of the positive active material.

7. The surface-treated positive active material as claimed in claim 1, wherein the coating element is at least one selected from a group consisting of Mg, Al, Co, K, Na, Ca, Si, Ti, Sn, V, Ge, Ga, B, As, Zr, and a combination thereof.

8. The surface-treated positive active material as claimed in claim 1, wherein the coating-element-containing compound is selected from a group consisting of a coating-element-containing alkoxide, a coating-element-containing salt, and a coating-element-containing oxide.

9. The surface-treated positive active material as claimed in claim 1, wherein an amount of the coating element is in a range of 0.1 and 50% by weight of the coating liquid.

10. The surface-treated positive active material as claimed in claim 9, wherein the amount of the coating element is in a range of 5 and 30% by weight of the coating liquid.

11. The surface-treated positive active material as claimed in claim 1, wherein an amount of the added water is in a range of 0.001 and 20 moles based on 1 mole of the coating element.

12. The surface-treated positive active material as claimed in claim 11, wherein the amount of the added water is in a range that is between 0.01 and 10 moles based on 1 mole of the coating element.

13. The surface-treated positive active material as claimed in claim 1, wherein the positive active material is a litigated intercalation compound selected from the group consisting of a lithium-containing metal oxide and a lithium-containing chalcogenide compound having one of the following formulas (1) to (13):

  (1)

  (2)

  (3)

  (4)

  (5)

  (6)

  (7)

  (8)

  (9)

  (10)

  (11)

  (12)

  (13)

wherein:
$0.9 \leq x \leq 1.1$; $0 \leq y \leq 0.5$; $0 \leq z \leq 0.5$; $0 \leq \alpha \leq 2$;

M is at least one element selected from a group consisting of Al, Ni, Co, Mn, Cr, Fe, Mg, Sr, V, and rare earth elements;

B is at least one element selected from a group consisting of 0, F, S, and P; and X is at least one element selected from a group consisting of F, S, and P.

14. The surface-treated positive active material as claimed in claim 1, wherein the positive active material is a lithium-containing metal oxide or a lithium-containing chalcogenide compound having a basic structure selected from a group consisting of cubic, hexagonal, and monoclinic structures.

15. The surface-treated positive active material as claimed in claim 1, wherein the coating of the positive active material with the coating liquid and the drying the coated positive active material comprise mixing the positive active material with the coating liquid while increasing the temperature so as to heat the mixture of the positive active material and the coating liquid.

16. The surface-treated positive active material as claimed in claim 1, wherein the mixing of the positive active material with the coating liquid further comprises mixing under one of a vacuum condition and a condition of injecting a purging gas, while increasing the temperature.

17. The surface-treated positive active material as claimed in claim 1, wherein the dried positive active material is further sieved through a sieve, thereby forming the surface-treatment layer on the active material.

18. A battery comprising:
a positive electrode comprising a surface-treated positive active material;
a negative electrode separated from the positive electrode and comprising a material that reversibly deintercalates/intercalates lithium ions with the positive electrode; and
an electrolyte disposed between the positive and negative electrodes comprising lithium salts and organic solvents through which the lithium ions pass,
wherein the surface-treated positive active material comprises an positive active material and a surface-treatment layer formed on the positive active material including at least one compound selected from a group consisting of a coating-element-containing hydroxide, a coating-element-containing oxyhydroxide, a coating-element-containing oxycarbonate, a coating-element-containing hydrocarbonate, and a mixture thereof,
wherein the surface-treatment layer is formed on the positive active material by:
adding a coating element or a coating-element-containing compound to an organic solvent to prepare an organic suspension;
adding water to the organic suspension to prepare a coating liquid;
coating the positive active material with the coating liquid; and
drying the coated active material, thereby forming the surface-treatment layer on the positive active material, and
wherein the coating element is at least one selected from a group consisting of an alkali metal, an alkaline earth metal, a group 13 element of the Periodic Table, a group 14 element of the Periodic Table, a group 15 element of the Periodic Table, a transition metal, and a combination thereof.

19. A surface-treated positive active material for a lithium secondary battery comprising:
a positive active material; and
a surface-treatment layer formed on the positive active material by a process comprising:
adding an Al-alkoxide to an organic solvent to prepare an Al-containing organic suspension;
adding water to the suspension to prepare a coating liquid;
coating the positive active material with the coating liquid; and
drying the coated positive active material, thereby forming the surface-treatment layer on the positive active material exhibiting a thickness in the range of 1-50 nm.

20. The surface-treated positive active material as claimed in claim 19, wherein an amount of the added water is in a range of 0.001 and 20 moles based on 1 mole of the Al-alkoxide.

21. The surface-treated positive active material as claimed in claim 20, wherein the amount of the added water is in a range of 0.01 and 10 moles based on 1 mole of the Al-alkoxide.

22. The surface-treated positive active material as claimed in claim 19, wherein the Al-alkoxide is Al-isopropoxide.

23. A surface-treated positive active material for a lithium secondary battery comprising:
   a positive active material; and
   a surface-treatment layer formed on the positive active material by a process comprising:
      adding an Al-alkoxide to an organic solvent to prepare an Al-containing organic suspension;
      adding water to the suspension to prepare a coating liquid;
      coating the positive active material with the coating liquid; and
      drying the coated positive active material, thereby forming the surface-treatment layer on the positive active material.

24. The surface-treated positive active material as claimed in claim 23, wherein the positive active material is a litigated intercalation compound.

25. A battery comprising:
   a positive electrode comprising a surface-treated positive active material;
   a negative electrode separated from the positive electrode and comprising a material that reversibly deintercalates/intercalates lithium ions with the positive electrode; and
   an electrolyte disposed between the positive and negative electrodes comprising lithium salts and organic solvents through which the lithium ions pass,
   wherein the surface-treated positive active material comprises a positive active material; and
   a surface-treatment layer formed on the positive active material by a process comprising:
      adding an Al-alkoxide to an organic solvent to prepare an Al-containing organic suspension;
      adding water to the suspension to prepare a coating liquid;
      coating the positive active material with the coating liquid; and
      drying the coated positive active material, thereby forming the surface-treatment layer on the positive active material.

26. The battery as claimed in claim 25, wherein the positive active material is a litigated intercalation compound.

* * * * *

UNITED STATES PATENT AND TRADEMARK OFFICE
CERTIFICATE OF CORRECTION

PATENT NO. : 7,316,865 B2  Page 1 of 1
APPLICATION NO. : 10/269991
DATED : January 8, 2008
INVENTOR(S) : Ho-jin Kweon et al.

It is certified that error appears in the above-identified patent and that said Letters Patent is hereby corrected as shown below:

Column 17, line 9, change "20moles" to --20 moles--.

Column 17, line 16, change "litigated" to --lithiated--.

Column 19, line 18, change "litigated" to --lithiated--.

Column 20, line 20, change "litigated" to --lithiated--.

Signed and Sealed this

Thirteenth Day of May, 2008

JON W. DUDAS
*Director of the United States Patent and Trademark Office*